United States Patent

Oota et al.

Patent Number: 5,478,362
Date of Patent: Dec. 26, 1995

[54] METHOD FOR PRODUCING A SPIRAL ELECTRODES

[75] Inventors: Kazuyoshi Oota, Sumoto; Kenji Inagaki; Makoto Kambayashi, both of Hyogo, all of Japan

[73] Assignee: Sanyo Electric Co., Ltd., Osaka, Japan

[21] Appl. No.: 186,868

[22] Filed: Jan. 27, 1994

[30] Foreign Application Priority Data

Jan. 29, 1993 [JP] Japan .................................. 5-013861

[51] Int. Cl.$^6$ ..................................................... H01M 2/18
[52] U.S. Cl. .......................... 29/623.1; 429/94; 429/143
[58] Field of Search ............................. 29/623.1; 429/94, 429/143

[56] References Cited

U.S. PATENT DOCUMENTS

| | | | |
|---|---|---|---|
| 3,761,314 | 9/1973 | Cailley | 429/94 |
| 4,663,247 | 5/1987 | Smilanich et al. | |
| 4,668,320 | 5/1987 | Crabtree | 429/94 X |
| 4,709,472 | 12/1987 | Machida et al. | 29/623.1 |
| 4,999,906 | 3/1991 | van Beek et al. | 29/623.1 |
| 5,116,698 | 5/1992 | Sears . | |

FOREIGN PATENT DOCUMENTS

| | | |
|---|---|---|
| 0136886A | 4/1985 | European Pat. Off. . |
| 53-146029 | 12/1978 | Japan . |
| 63-128567 | 6/1988 | Japan . |
| 3-216953 | 9/1991 | Japan . |

*Primary Examiner*—Stephen Kalafut
*Attorney, Agent, or Firm*—Armstrong, Westerman, Hattori, McLeland & Naughton

[57] ABSTRACT

A method of producing a spiral electrode group comprising a step for preparing a beltlike positive electrode plate whose thickness and width PT are PW respectively, a beltlike negative electrode plate whose thickness and width are NT and NW respectively, a beltlike first separator whose width is longer than PW+2PT, and a beltlike second separator whose width is longer than NW+2NT; a second step of making a set of the first separator and the positive electrode plate by putting a central part of the first separator and a surface of the positive electrode plate together, and by putting each horizontal end of the first separator and each side surface of the positive electrode plate together; a third step of making a set of the second separator and the negative electrode plate by putting a central part of the second separator and a surface of the negative electrode plate together, and by putting each horizontal end of the second separator and each side surface of the negative electrode plate together; and a fourth step of spirally winding the set of the first separator and the positive electrode plate with the set of the second separator and the negative electrode plate in a longitudinal direction of the positive and the negative electrode plate.

32 Claims, 6 Drawing Sheets

Fig. 2(a) PRIOR ART
Fig. 2(b) PRIOR ART
Fig. 2(c) PRIOR ART
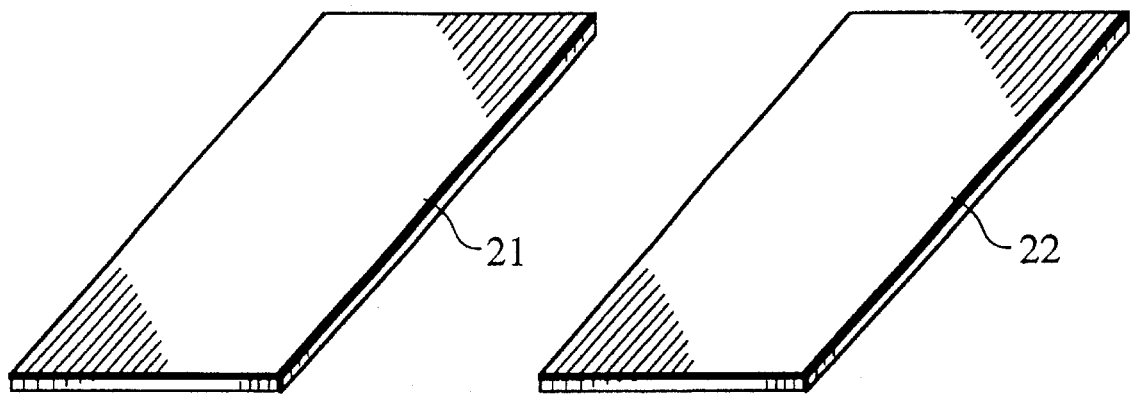
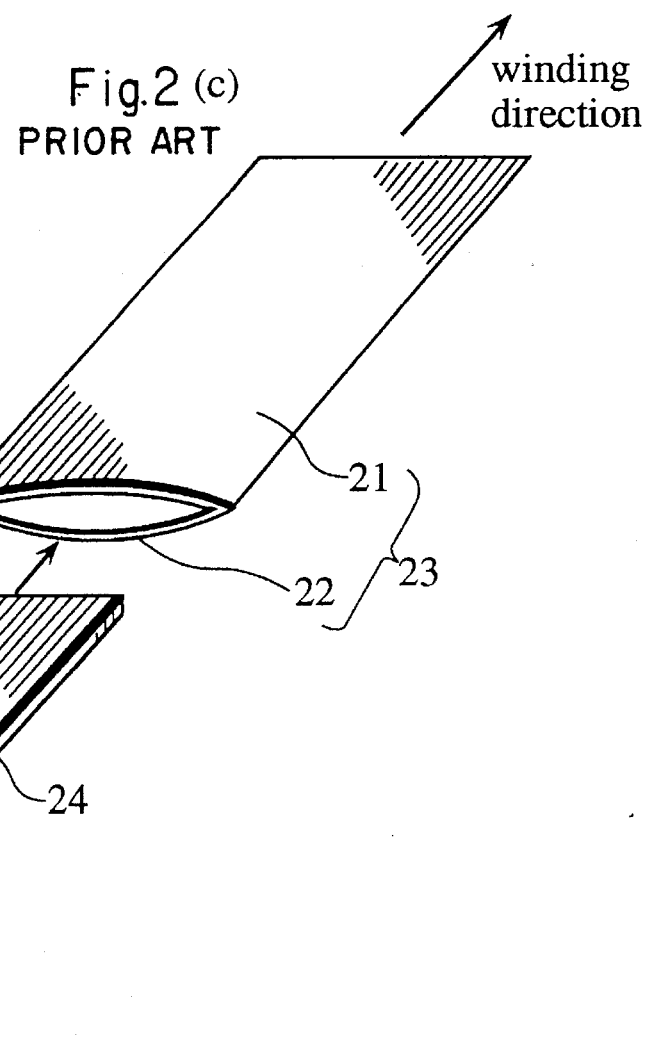

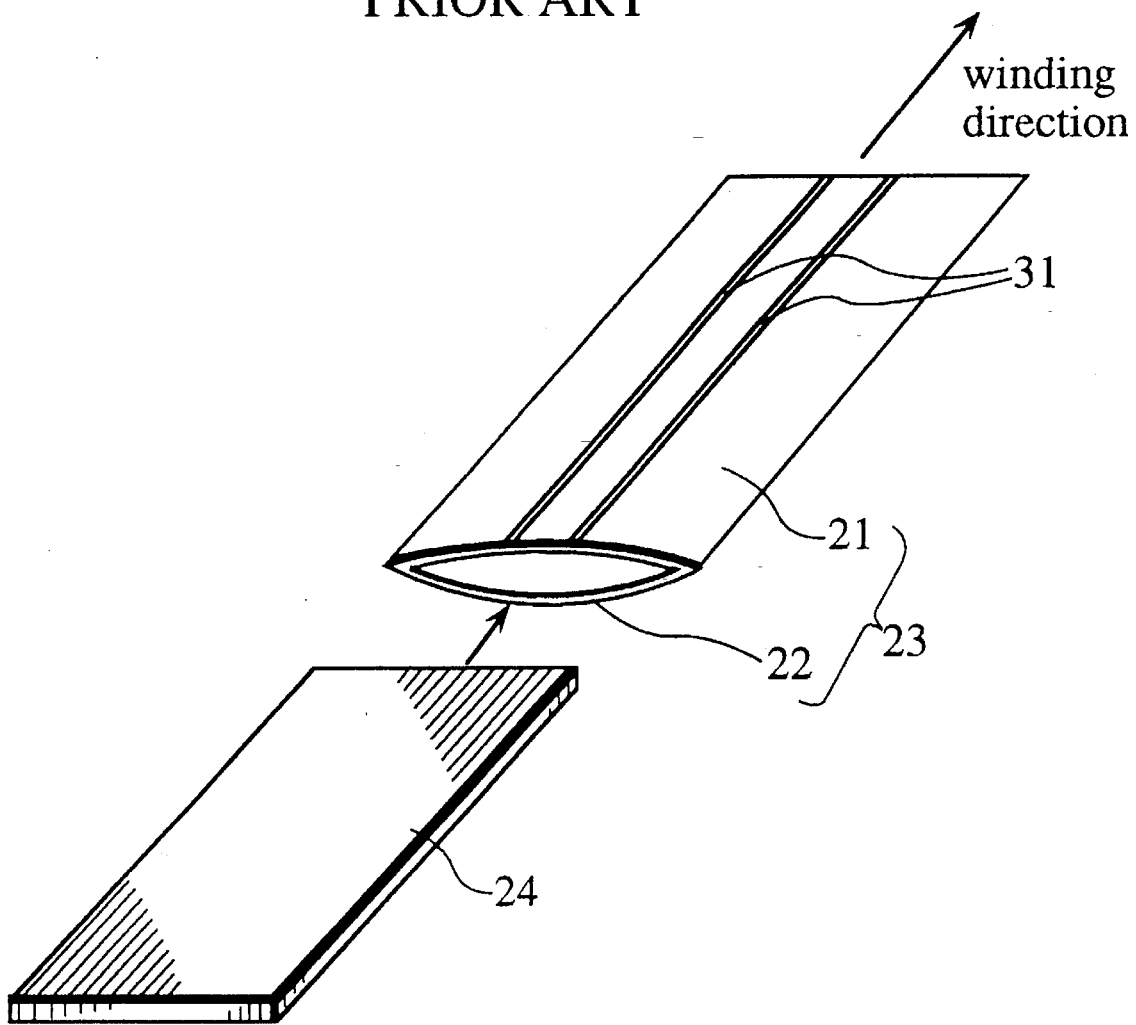

METHOD FOR PRODUCING A SPIRAL ELECTRODES

BACKGROUND OF THE INVENTION (1) Field of the invention

The present invention relates to a method for producing a spiral electrode group for a cylindrical cell or the like, particularly to a method for spirally winding both an electrode plate and a separator.

(2) Description of the Related Art

A spiral electrode group comprises electrode plate and a separator which are wound together. More specifically, a separator is placed between a positive electrode and a negative electrode in the spiral electrode group. A general cell employing such spiral electrode group has a problem of an internal short-circuiting caused by a separation of active materials from ends of electrode plates, a dendrite growth, or the like. Conventionally, the internal short-circuiting is prevented by making the width of the separator which is perpendicular to the winding direction longer than the width of the electrode plate. Otherwise, as shown in FIG. 1, a positive electrode plate 11 and a negative electrode plate 13 are shifted to have a gap between their ends 11a and 13a, the end 11a for the positive electrode plate 11 and the end 13a for the negative electrode plate 13. Or the internal short-circuiting is prevented by inserting an insulator between the ends of the electrode plates and a cell container.

The internal short-circuiting caused by the separation of active materials from the ends of the electrode plates, hoverer, cannot be fully prevented by the above methods. Also the extended width of the separator may exceed a height of a cell container. That is, the height of the cell container is limited, and it cannot be extended in accordance with the width of the separator. Therefore, the electrode group could not be stored into the cell container without Gutting the width of the electrode plates.

Another proposed method for spirally winding the separator and the electrode plates will be described as referring to FIGS. 2 (a)–(c). One of two identical sheets 21 and 22 in FIG. 2 (a), (b) is piled upon the other, and a bag-shaped separator 23 in FIG. 2(c) is made by heating to paste three ends of the sheets 21 and 22. Subsequently, a positive or negative electrode plate 24 is inserted into the separator 23, and the separator 23 and another electrode plate are wound together. In a spiral electrode group produced by this method, however, a thickness t of the electrode plate 24 is added to the separator 23; therefore, there may be a big difference in a length between an inner track 21 and an outer track 22 of the separator 23. Such difference would be compensated by shrinking the inner track 21 and extending the outer track 22 when winding the separator 23; however, the separator 23 is simply comprised of the two identical sheets piled on each other, so that it is impossible to shrink the inner track. The difference between the inner track 21 and the outer track 22 causes wrinkles around the inner track 21; and pressure between the electrode plates is focused around the wrinkles, whereby the wrinkles will be damaged. As a result, the inner short-circuiting is likely to occur.

The generation of the wrinkles at the inner track will be suppressed by having a linear heat sealing unit 31 on a surface of the bag-shaped separator 23 at right angles to the winding direction. Then the separator 23 will be wound by making the surface with the linear heat sealing unit 31 inside (see Japanese Laid-open Patent Application No. 63-128567).

However, manufacturing cost of the bag-shaped separator with the linear heat sealing unit is expensive, although it suppresses the inner short-circuiting caused by the wrinkles. Therefore, said proposed method will not be suitable for a mass production of the spiral electrode group.

SUMMARY OF THE INVENTION

Accordingly, it is an object of the present invention to provide a method for producing a spiral electrode group at an inexpensive cost as suppressing an inner short-circuiting.

The above object may be fulfilled by a method for producing a spiral electrode group, from beltlike electrode plates having opposed parallel main surfaces and substantially rectangularly arranged side surfaces extending therebetween the method comprising a first step at preparing a beltlike positive electrode plate whose thickness and width are PT and PW respectively, the width being perpendicular to a longitudinal direction of the positive electrode plate, a beltlike negative electrode plate whose thickness and width are NT and NW respectively, the width being perpendicular to a longitudinal direction of the negative electrode plate, a beltlike first separator whose width is longer than PW+2PT, the width being perpendicular to a longitudinal direction of the first separator, and a beltlike second separator whose width is longer than NW+2NT, the width being perpendicular to a longitudinal direction of the second separator; a second step of making a set of the first separator and the positive electrode plate by putting a central part of the first separator and a main surface of the positive electrode plate together, the central part including a center of the width of the first separator, and by putting a horizontal end of the first separator and a side surface of the positive electrode plate together, the horizontal end being disposed at an end of the width of the first separator while the side surface is disposed at an end of the width of the positive electrode plate; a third step of making a set of the second separator and the negative electrode plate by putting a central part of the second separator and a main surface of the negative electrode plate together, the central part including a center of the width of the second separator, and by putting a horizontal end of the second separator and a side surface of the negative electrode plate together, the horizontal end being disposed at an end of the width of the second separator while the side surface is disposed at an end of the width of the negative electrode plate; and a fourth step at spirally winding the set of the first separator and the positive electrode plate with the set of the second separator and the negative electrode plate in the longitudinal direction of the positive electrode plate and the negative electrode plate.

According to the above production method, both an electrode plate and a separator are put together so that a horizontal side of the electrode plate is covered with a horizontal end of the separator. Therefore, the separation of active material from ends of the electrode plate can be prevented, and this results in a suppression of the inner short-circuiting. Thus, according to the above method, the short circuiting can be suppressed without preparing the conventional bag-shaped separator or generating the heat sealing unit at the inner track of the separator, whereby a mass production of the separator can be implemented at an inexpensive manufacturing cost.

The width PW of the positive electrode plate and the width NW of the negative electrode plate prepared at the first step may be identical to each other.

A width PSW of the first separator prepared at the first step may satisfy an inequality 1: PW+2PT<PSW≦PW+2PT+2NST+2NT, in which NST represents a thickness of the second separator; and a width NSW of the second separator prepared at the first step may satisfy an inequality 2: NW+2NT< NSW≦NW+2NT+2PST+2PT, in which PST represents a thickness of the first separator.

In the above, the widths of the positive and negative electrode plates are identical. When the sum of the width of the electrode plate and the separator is larger than the right arm in the inequality 1 and 2, the horizontal end of the separator will exceed the horizontal end of the neighboring separator and cover the secondly neighboring separator. As a result, the separator will be covered three times. Since the width of the electrode group increases according to a thickness of the separator, the unnecessarily covered separator will reduce storage space of a cell container. On the other hand, in the above method the, sum of the width of the electrode plate and the separator is limited, so that the horizontal end of the separator only covers the immediately neighboring separator.

At the fourth step, the main surface of each electrode plate, which was set with the separator, may face toward a back surface of an oppositely polarized separator, and the separators are wound together by making a main surface of the oppositely polarized separator inside.

By winding separators after putting the main surface of the negative electrode plate with the back surface of the positive electrode plate and making the main surface of the positive electrode plate inside, tension will be applied to the horizontal ends of each separator. Helped by the tension, the horizontal ends of a first separator smoothly covers the horizontal ends of a second separator. As a result, structure around the horizontal ends of the first and the second separators will be stronger, and the inner short-circuiting will be suppressed better. Additionally, the main surface of the electrode plate represents a surface, except every side surface.

The horizontal ends of the first separator which are bent in the same direction may be each the same length.

The horizontal ends of the second separator which are bent in the same direction may be the same length to each.

In the above, the horizontal ends of the separator are the same length as each other; accordingly, both ends of the spiral electrode group will be the same length.

At the second step, the first separator may be shaped into the concave by preparing a first concave frame with a groove whose width is slightly longer than PW, the width being perpendicular to a longitudinal direction of the groove, and a first plate whose width corresponds substantially with PW, the width being perpendicular to a longitudinal direction of the first plate; overlapping the central part of the first separator with a central part of the groove, the central part of the groove including a center of the width of the groove; and pushing the first separator with the first plate so that first separator is inserted into the groove of the first concave frame.

At the second step the second separator may be shaped into the concave by preparing a second concave frame with a groove whose width is slightly longer than NW, the width being perpendicular to a longitudinal direction of the groove, and a second plate whose width corresponds substantially with NW, the width being perpendicular to a longitudinal direction of the second plate; overlapping the central part of the second separator with a central part of the groove, the central part of the groove including a center of the width of the groove; and pushing the second separator with the second plate so that the second separator is inserted into the groove of the second concave frame.

In the above, a concave-shaped separator can be generated simply by placing the separator on the concave frame and pressing it with the plate. Therefore, productivity will be improved.

At the second step the set of the first separator and the positive electrode plate may be generated by preparing a first concave frame with a groove whose width is slightly longer than PW, the width being perpendicular to a longitudinal direction of the groove, and a first plate whose width corresponds substantially with PW, the width being perpendicular to a longitudinal direction of the first plate; overlapping the central part of the first separator and a central part of the positive electrode plate with a central part of the groove, the central part of the positive electrode plate including a center of the width thereof while the central part of the groove including a center of the width thereof; and pushing the first separator with the first plate so that the first separator is inserted into the groove of the first concave frame.

At the second step the set of the second separator and the negative electrode plate may be generated by preparing a second concave frame with a groove whose width is slightly longer than NW, the width being perpendicular to a longitudinal direction of the groove, and a second plate whose width corresponds substantially with NW, the width being perpendicular to a longitudinal direction of the second plate; overlapping the central part of the second separator and a central part of the negative electrode plate with a central part of the groove, the central part of the negative electrode plate including a center of the width thereof while the central part of the groove including a center of the width thereof; and pushing the second separator with the second plate so that the second separator is inserted into the groove of the second concave frame.

In the above, the separator combined with the electrode plate can be generated simply by placing the separator and the electrode plate on the concave frame and pressing them with the plate. Therefore, productivity will be improved.

The above object may be fulfilled by a method for producing a spiral electrode group, the method comprising: a first step of preparing a beltlike positive electrode plate whose thickness and width PT are PW respectively, the width being perpendicular to a longitudinal direction of the positive electrode plate, a beltlike negative electrode plate whose thickness and width are NT and NW respectively, the width being perpendicular to a longitudinal direction of the negative electrode plate, a beltlike first separator whose width is longer than PW+2PT, the width being perpendicular to a longitudinal direction of the first separator, and a beltlike second separator whose width is longer than NW+2NT, the width being perpendicular to a longitudinal direction of the second separator; a second step of shaping the first separator into a concave by setting its central part to be PW while setting its horizontal end to be longer than PT, the central part including a center of the width of the first separator while the horizontal end being disposed at one end of the width of the first separator, and forming a groove by bending both of the horizontal ends in one direction; a third step for shaping the second separator into a concave by setting its central part to be NW while setting its horizontal end to be longer than NT, the central part including a center of the width of the second separator while the horizontal end being disposed at one end of the width of the second separator, and forming a groove by bending both of the horizontal ends in one direction; a fourth step of inserting the positive electrode plate into the groove of the first separator; a fifth step of inserting the negative electrode plate into the groove of the second separator; and a sixth step of putting the first separator and the second separator together, the first separator into which the positive electrode plate is inserted and the second separator into which the negative electrode plate is inserted, and spirally winding the first separator and the second separator together in the longitudinal direction of the positive electrode plate and the negative electrode plate.

In the above, each horizontal end of the separator which is bent in one direction is longer than a thickness of the electrode plate which is inserted into the separator; therefore, the horizontal sides of the electrode plate will be fully covered. Further, since the horizontal end of the separator also covers the horizontal end of the neighboring oppositely polarized separator, the active materials separated from the electrode plate will not move to the oppositely polarized separator. As a result, the inner short-circuiting can be suppressed effectively.

The above object may be fulfilled by a method for producing a spiral electrode group, from beltlike electrode plates having opposed parallel main surfaces and substantially rectangularly arranged sid surfaces extending therebetween the method comprising: a first step of preparing a beltlike positive electrode plate whose thickness and width PT are PW respectively, the width being perpendicular to a longitudinal direction of the positive electrode plate, a beltlike negative electrode plate whose thickness and width are NT and NW respectively, the width being perpendicular to a longitudinal direction of the negative electrode plate, a beltlike first separator whose width is longer than PW+2PT, the width being perpendicular to a longitudinal direction of the first separator, and a beltlike second separator whose width is longer than NW+2NT, the width being perpendicular to a longitudinal direction of the second separator; a second step of setting a horizontal end of the first separator to be longer than PT, the horizontal end being disposed at an end of the width of the first separator, placing a main surface of the positive electrode plate on a parallel surface of the first separator, and bending the horizontal end of the first separator along with a side surface of the positive electrode plate, the side surface being disposed at an end of the width of the positive electrode plate; a third step of setting a horizontal end of the second separator to be longer than NT, the horizontal end being disposed at an end of the width of the second separator, placing a main surface of the negative electrode plate on a parallel surface of the second separator, and bending the horizontal end of the second separator along with a side surface of the negative electrode plate, the side surface placing at an end of the width of the negative electrode plate; and a fourth step of spirally winding the positive electrode plate which is bent with the first separator and the negative electrode plate which is bent with the second separator together in the longitudinal direction of the positive electrode plate and the negative electrode plate.

In the above, the horizontal ends of the separator are bent along with the horizontal sides of the electrode plate. Accordingly, the separation of the active material from the horizontal side of the electrode plate can be prevented, so that the inner short-circuiting can be suppressed. Also producing the separator into which the electrode plate is inserted by bending the separator and the electrode plate together, simplifies the production procedure, which results in the improvement in productivity.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows a conventional bag-shaped separator;

FIG. 3 shows a conventional bag-shaped separator having a heat sealing unit on one surface

DESCRIPTION OF THE PREFERRED EMBODIMENT

A spiral electrode group was produced by a method in an embodiment of the present invention. That is, a spiral electrode group in FIG. 4 was prepared by winding a positive electrode plate 1 comprised of a well known sintered nickel electrode, a positive electrode separator 2 comprised of a polyamide nonwoven fabric, a negative electrode plate 3 comprised of a cadmium active material, and a negative electrode separator 4 comprised of a polyamide nonwoven fabric. The method for producing the spiral electrode group will be described in detail.

(Production Example 1)
(1) Production of Positive Electrode Plate and Negative Electrode Plate A positive electrode plate and a negative electrode each having opposed, substantially parallel main surfaces and substantially rectangularly arranged side surfaces extending therebetween having a same width were prepared (positive electrode plate: length=1000 mm, width (PW)=35mm, thickness (PT)=0.60 mm; negative electrode plate: length= 135 mm, width (NW)=35 mm, thickness (NT)=0.50 mm). A width of an electrode plate was perpendicular to its longer side.

(2) Production of Positive Electrode Separator and Negative Electrode

Figure 5:
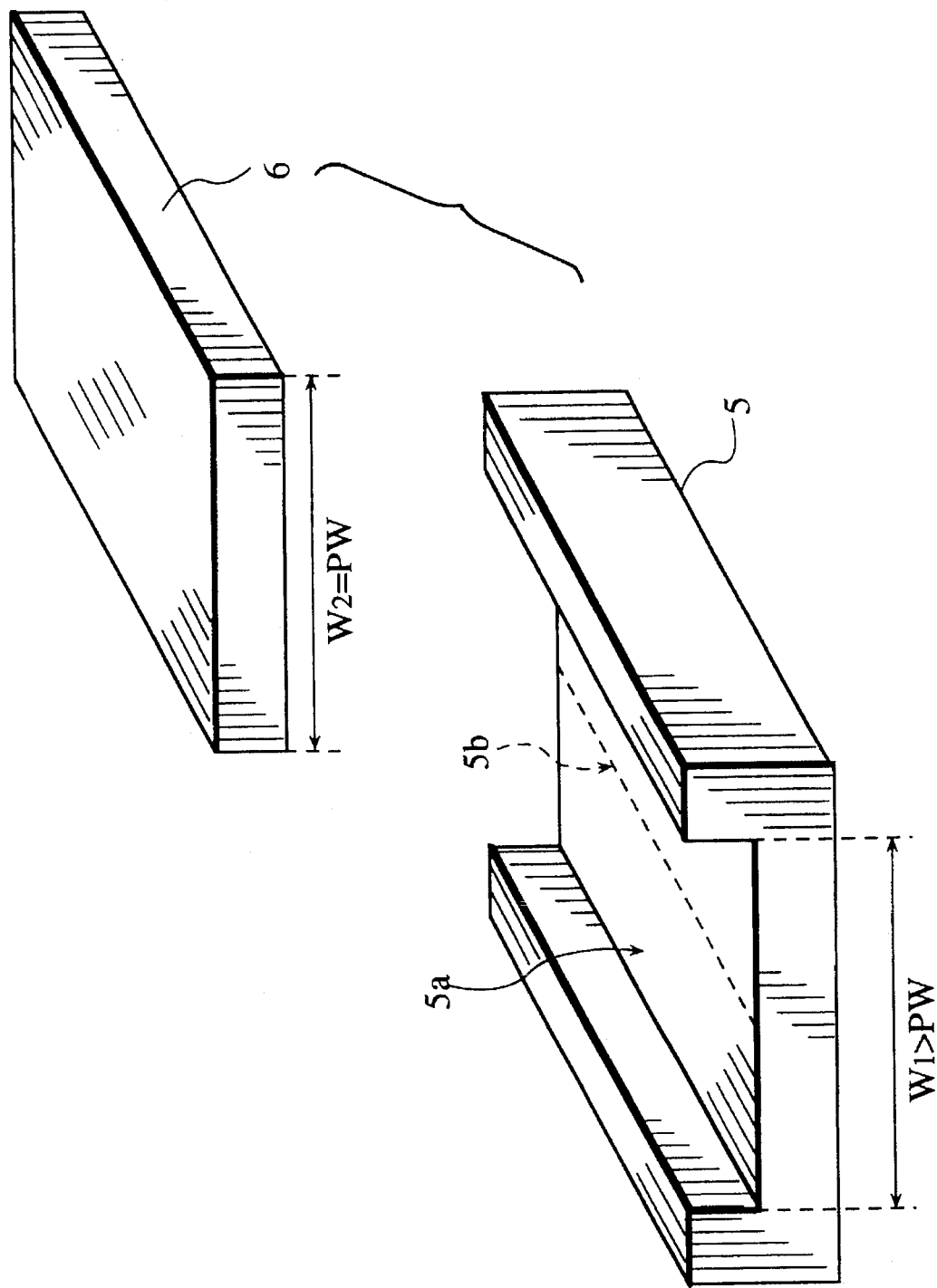
FIG. 5 is a cross sectional view of a concave frame and a plate to be employed at production of a spiral electrode group.

A concave frame 5 and a plate 6 to be inserted into the concave frame 5 in FIG. 5 were prepared. The concave frame 5 had a groove 5a (groove width $W_1$ 35.3 mm) which was slightly longer than a width of a positive electrode plate (PW) while a width $W_2$ of the plate 6 was the same as PW.

Figure 6:
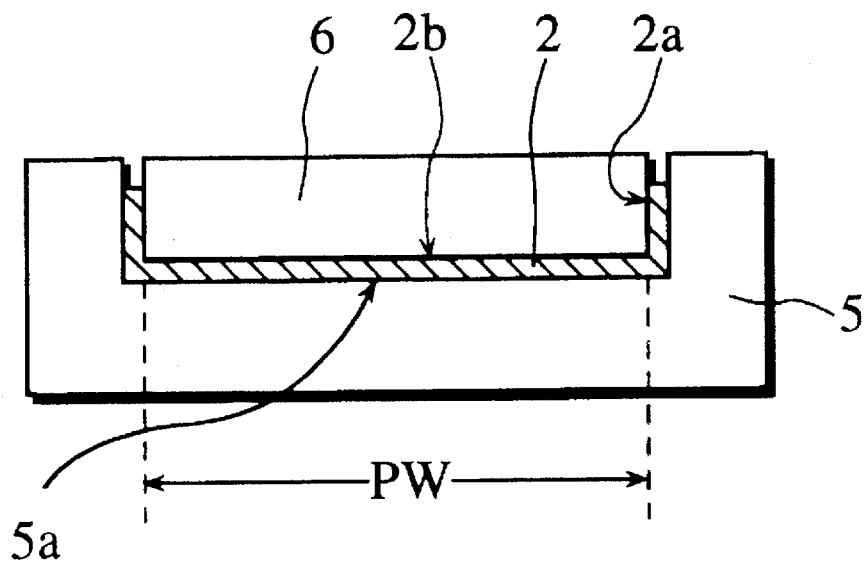
FIG. 6 shows a step of a method for producing a spiral electrode group.

A polyamide nonwoven fabric (Weight 85 g/m$^3$, width 36.8mm, thickness 0.2mm) for an positive electrode separator was put over the groove 5a of the concave frame 5, in which a horizontal center of the fabric overlaps with a horizontal center 5b of the groove 5a. Then, as shown in FIG. 6 the polyamide nonwoven fabric on the concave frame 5 was pressed with the plate 6 so that the polyamide nonwoven fabric is inserted into the groove 5a; and horizontal ends of the polyamide nonwoven fabric are bent upward at around 90°. Thus, the positive electrode separator 2 was produced.

A polyamide nonwoven fabric (Weight 85 g/m³, width 36.6 mm, thickness 0.2 mm) for a negative electrode separator was prepared. The width of the polyamide nonwoven fabric for the negative electrode separator was shorter than the width of the polyamide nonwoven fabric for the positive electrode separator by 0.2mm. Substantially same as the positive electrode separator 2, the negative electrode separator 4 was produced from the polyamide nonwoven fabric. More specifically, since a width of the negative electrode plate (NW) is set to be identical to a width of the positive electrode plate (PW), the negative electrode separator 4 was produced by using the concave frame 5 and the plate 6.

(3) Insertion of Electrode Plate into Groove Separator

The positive electrode plate 1 and the negative electrode plate 3 are inserted into the groove 2b of the positive electrode separator 2 and the groove 4b of the negative electrode separator 4 respectively.

(4) Production of Spiral Electrode Group

A spiral electrode group was produced by winding the positive electrode separator 2 and the negative electrode separator 4 together around an axis. More specifically, the positive electrode separator 2 was wound with the negative electrode separator 4 by overlapping their horizontal ends and making openings of the groove 2b inside.

The produced electrode group was named as an (a) electrode group.

(Production Example 2)

A spiral electrode group was produced substantially the same as the Production Example 1 excepting (2) and (3).

Figure 7:
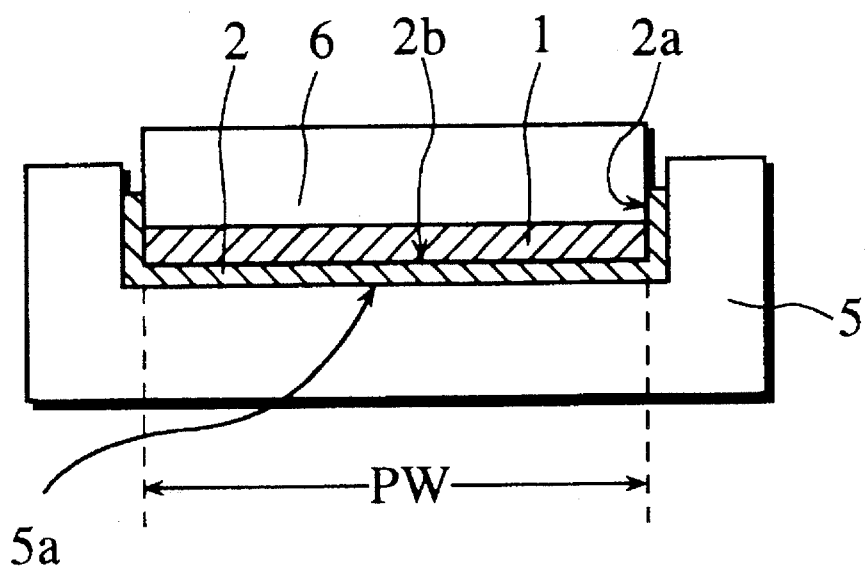
FIG. 7 shows another step of a method for producing a spiral electrode group.

The positive electrode separator 2 and the positive electrode plate 1 were put over the concave plate 5, in which their horizontal center overlaps with the horizontal center 5b of the groove 5a. Subsequently, as shown in FIG. 7 the positive electrode separator 2 and the positive electrode plate 1 are pressed with the plate 6 so that they were inserted into the groove 5a. Then, each horizontal end 2a of the positive electrode separator 2 is bent upward at around 90°, whereby the positive electrode separator 2 in which the positive electrode plate 1 is inserted into the groove 2b was produced. Substantially the same as the positive electrode separator 2, the negative electrode separator 4 in which the negative electrode plate 3 is inserted into the groove 4b was produced. Substantially the same as the above step (4), a spiral electrode group was produced, and this was named as a (b) electrode group.

Figure 1:
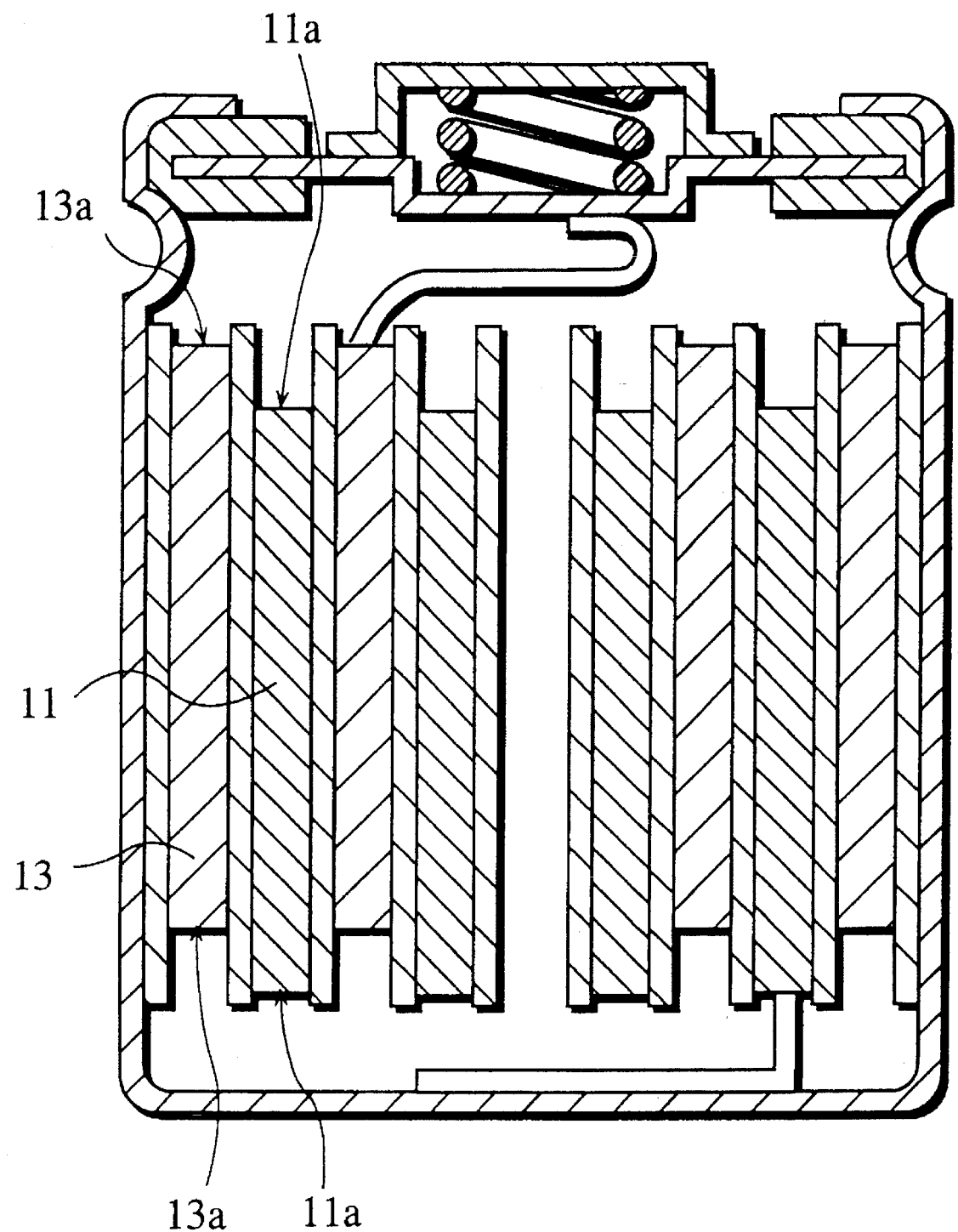
FIG. 1 is a cross sectional view of a cylindrical cell employing a conventional spiral electrode group.
Figure 4:
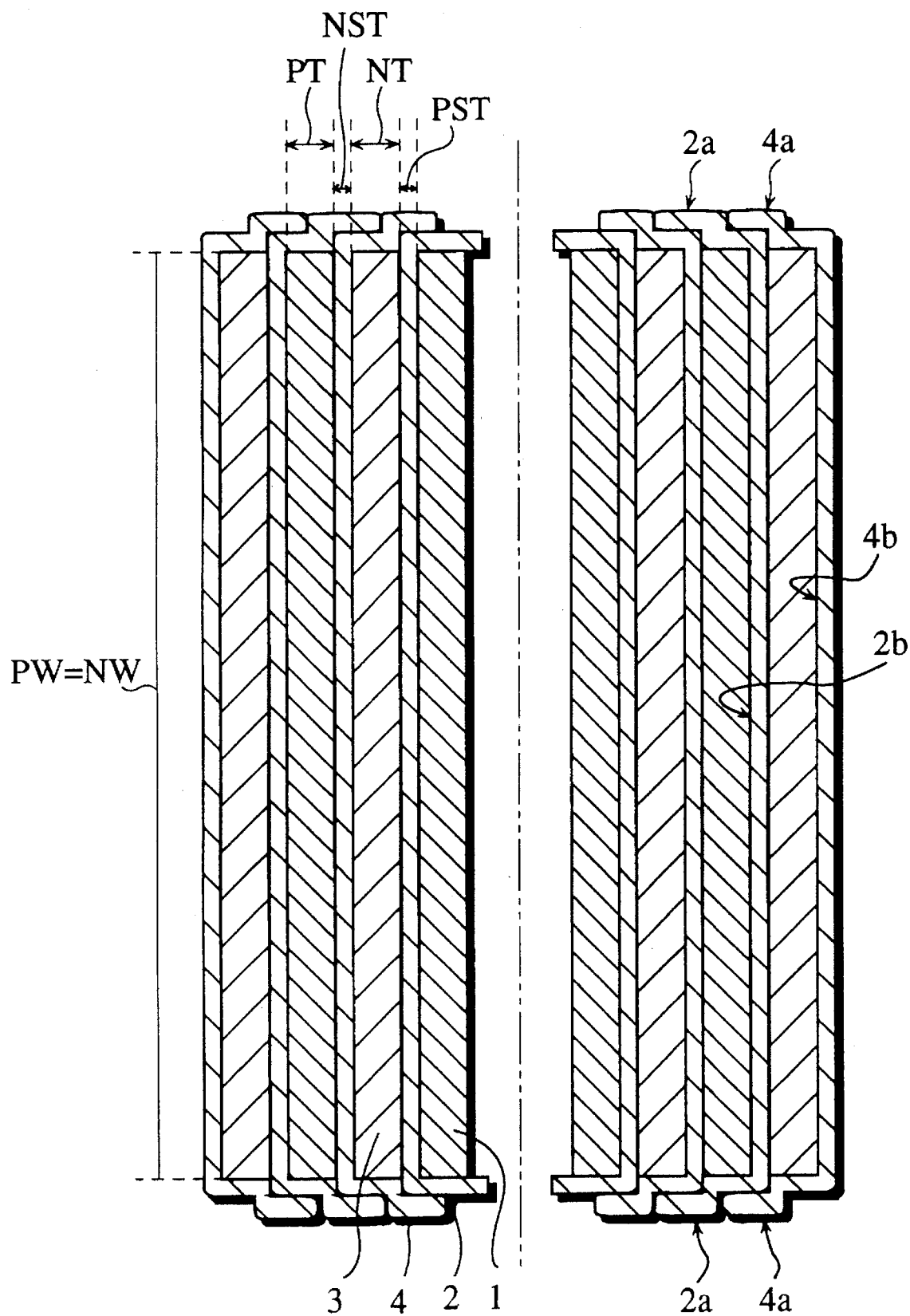
FIG. 4 is a cross sectional view of a spiral electrode group generated by a method in an embodiment of the present invention.

FIG. 4 shows the spiral electrode groups produced by the production example 1 and 2. In the figure, the positive electrode plate 1 is inserted into the groove 2b of the positive electrode separator 2, so that the horizontal ends of the positive electrode plate 1 were fully covered with the horizontal ends 2a of the positive electrode separator 2. Also the negative electrode plate 3 is inserted into the groove 4b of the negative electrode separator 4, so that the horizontal ends of the negative electrode plate 3 were fully covered with the horizontal ends 4a of the negative electrode separator 4. Further, since the positive electrode separators 2 were placed inside, the horizontal ends 2a were covered with the horizontal ends 4a.

(Comparative Example 1)

The same size of separators in the above embodiment were prepared, and a spiral electrode group was produced substantially same as the above except that the separators were wound together via a positive and a negative electrode plate without bending horizontal ends of the separators. The produced electrode group was named as an ($x_1$) electrode group.

(Comparative Example 2)

A bag-shaped separator 23 in FIG. 3 was prepared, and a linear heat sealing unit 31 was generated on a surface 21 of the bag-shaped separator 23 at right angles to a winding direction. Either a positive or a negative electrode plate 24 is inserted into the separator 23, and the separator 23 is wound with another electrode plate by making the surface 21 inside. Thus, a spiral electrode group was generated, and this was named as an ($x_2$) electrode group.

(Experiment 1)

A width perpendicular to a winding direction was measured for the (a) electrode group and the (b) electrode group produced in the production example 1 and 2, and for the ($x_1$) electrode group produced in the comparative example.

It was found that both the width of the (a) electrode group and the width of the (b) electrode group were 36.0 mm, while the width of the ($x_1$) electrode group was 37.0 mm.

Thus, the width of the electrode group produced by the method in the present invention was shorter than the width of the electrode group produced in the comparative example by 0.1 mm. As a result, a storage space in a cell container was improved.

The width of the electrode groups both in the present invention and the comparative example were longer than the width of the electrode plate or the width of the separator measured prior to the winding. This was due to the thickness of the separator or a small slip occurring at the winding.

(Experiment 2)

A hundred of cells (A), cells (B), cells ($X_1$), and cells ($X_2$) were prepared by employing the electrode group (a), (b), ($x_1$), and ($x_2$) respectively. By dropping the cells (A), (B), ($X_1$), and ($X_2$) from 1 m height, a generation rate of the inner short-circuiting was examined in each cell group. It was found that the short-circuiting was generated at significantly high rate of 7/100 in the cells ($X_1$) while it was generated at significantly low rate of 1/100 in the cells (A), (B), and ($X_2$). Thus, it was confirmed that the cell employing the electrode group produced in the present invention suppressed the short-circuiting like the cell in which the electrode plate was inserted into the bag-shaped separator. It was understood that the suppression of the short-circuiting was achieved by preventing a transition of the active material separated from the electrode plate to the oppositely polarized electrode plate. More specifically, in the electrode group (a) and (b), the horizontal ends of the electrode plate were fully covered with horizontal ends of the separator; further, the horizontal ends of the positive separator were fully covered with the horizontal ends the negative separator which placed outside when they were wound together. Accordingly, the transition of the active material was prevented.

(Additional Condition)
(1) Although the width PW of the positive electrode plate was identical to the width NW of the negative electrode plate in the above embodiment, they may be different from each other.
(2) Although in the above embodiment the opening of the groove faced inside, it may be turned toward outside.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method for producing a spiral electrode group from beltlike electrode plates having opposed parallel main surfaces and substantially rectangularly arranged side surfaces extending therebetween, the method comprising:

a first step of preparing a beltlike positive electrode plate whose thickness and width are PT and PW respectively, the width being perpendicular to a longitudinal direction of the positive electrode plate, a beltlike negative electrode plate whose thickness and width are NT and NW respectively, the width being perpendicular to a longitudinal direction of the negative electrode plate, a beltlike first separator whose width is longer than PW+2PT, the width being perpendicular to a longitudinal direction of the first separator, and a beltlike second separator whose width is longer than NW+2NT, the width being perpendicular to a longitudinal direction of the second separator;

a second step of making a set of the first separator and the positive electrode plate by putting a central part of the first separator and a main surface of the positive electrode plate together, the central part including a center of the width of the first separator, and by putting a horizontal end of the first separator and a side surface of the positive electrode plate together, the horizontal end placing at an end of the width of the first separator while the side surface placing at an end of the width of the positive electrode plate;

a third step of making a set of the second separator and the negative electrode plate by putting a central part of the second separator and a main surface of the negative electrode plate together, the central part including a center of the width of the second separator, and by putting a horizontal end of the second separator and a side surface of the negative electrode plate together, the horizontal end being disposed at an end of the width of the second separator while the side surface is disposed at an end of the width of the negative electrode plate; and a fourth step of spirally winding the set of the first separator and the positive electrode plate with the set of the second separator and the negative electrode plate in the longitudinal direction of the positive electrode plate and the negative electrode plate.

2. The method of claim 1, wherein the width PW of the positive electrode plate and the width NW of the negative electrode plate prepared at the first step are identical to each other.

3. The method of claim 2, wherein a width PSW of the first separator prepared at the first step satisfies an inequality 1: PW+2PT<PSW≦PW+2PT+2NST+2NT, in which NST represents a thickness of the second separator; and a width NSW of the second separator prepared at the first step satisfies an inequality 2: NW+2NT<NSW≦NW+2NT+2PST+2PT, in which PST represents a thickness of the first separator.

4. The method of claim 3, wherein at the fourth step the main surface of each electrode plate which was set with the separator faces toward a back surface of an oppositely polarized separator, and the separators are wound together by making a main surface of the oppositely polarized separator inside.

5. The method of claim 3, wherein at the second step the first separator is shaped into a concave by setting the central part to be PW while setting one horizontal end to be longer than PT, generating a groove by bending both of the horizontal ends in one direction, and inserting the positive electrode plate into the groove.

6. The method of claim 3, wherein at the second step the second separator is shaped into a concave by setting the central part to be NW while setting one horizontal end to be longer than NT, generating a groove by bending both of the horizontal ends in one direction, and inserting the negative electrode plate into the groove.

7. The method of claim 5, wherein the horizontal ends of the first separator which are bent in the same direction are each the same length.

8. The method of claim 6, wherein the horizontal ends of the second separator which are bent in the same direction are each the same length.

9. The method of claim 7, wherein at the second step the first separator is shaped into the concave by preparing a first concave frame with a groove whose width is closely conforming with, but greater than PW, the width being perpendicular to a longitudinal direction of the groove, and a first plate whose width conforms substantially with PW, the width being perpendicular to a longitudinal direction of the first plate; overlapping the central part of the first separator with a central part of the groove, the central part of the groove including a center of the width of the groove; and pushing the first separator with the first plate so that the first separator is inserted into the groove of the first concave frame.

10. The method of claim 8, wherein at the second step the second separator is shaped into the concave by preparing a second concave frame with a groove whose width is closely conforming with, but greater than NW, the width being perpendicular to a longitudinal direction of the groove, and a second plate whose width conforms substantially with NW, the width being perpendicular to a longitudinal direction of the second plate; overlapping the central part of the second separator with a central part of the groove, the central part of the groove including a center of the width of the groove; and pushing the second separator with the second plate so that the second separator is inserted into the groove of the second concave frame.

11. The method of claim 3, wherein at the second step the set of the first separator and the positive electrode plate is generated by setting both of the horizontal ends of the first separator to be longer than PT, placing the main surface of the positive electrode plate on the main surface of the first separator, and bending each horizontal end of the first separator along with the corresponding side surface of the positive electrode plate.

12. The method of claim 3, wherein at the second step the set of the second separator and the negative electrode plate is generated by setting both of the horizontal ends of .the second separator to be longer than NT, placing the main surface of the negative electrode plate on the main surface of the second separator, and bending each horizontal end of the first separator along with the corresponding side surface of the negative electrode plate.

13. The method of claim 11, wherein the horizontal ends of the first separator which are bent in the same direction are each the same length.

14. The method of claim 12, wherein the horizontal ends of the second separator which are bent in the same direction are each the same length.

15. The method of claim 13, wherein at the second step the set of the first separator and the positive electrode plate is generated by preparing a first concave frame with a groove whose width is closely conforming with, but greater than PW, the width being perpendicular to a longitudinal direction of the groove, and a fist plate whose width conforms substantially with PW, the width being perpendicular to a longitudinal direction of the fist plate; overlapping the central part of the first separator and a central part of the positive electrode plate with a central part of the groove, the central part of the positive electrode plate including a center of the width thereof while the central part of the groove including a center of the width thereof; and pushing the first separator with the first plate so that the first separator is inserted into the groove of the first concave frame.

16. The method of claim 14, wherein at the second step the set of the second separator and the negative electrode plate is generated by preparing a second concave frame with a groove whose width is closely conforming with, but greater than NW, the width being perpendicular to a longitudinal direction of the groove, and a second plate whose width conforms substantially with NW, the width being perpendicular to a longitudinal direction of the second plate; overlapping the central part of the second separator and a central part of the negative electrode plate with a central part of the groove, the central part of the negative electrode plate including a center of the width thereof while the central part of the groove including a center of the width thereof; and pushing the second separator with the second plate so that the second separator is inserted into the groove of the second concave frame.

17. A method for producing a spiral electrode group from beltlike electrode plates having opposed parallel main surfaces and substantially rectangularly arranged side surfaces extending therebetween, the method comprising:

a first step of preparing a beltlike positive electrode plate whose thickness and width are PT and PW respectively, the width being perpendicular to a longitudinal direction of the positive electrode plate, a beltlike negative electrode plate whose thickness and width are NT and NW respectively, the width being perpendicular to longitudinal direction of the negative electrode plate, a beltlike first separator whose width is longer than PW+2PT, the width being perpendicular to a longitudinal direction of the first separator, and a beltlike second separator whose width is longer than NW+2NT, the width being perpendicular to a longitudinal direction of the second separator;

a second step of shaping the first separator into a concave by setting its central part to be PW while setting its horizontal end to be longer than PT, the central part including a center of the width of the first separator while the horizontal end placing at one end of the width of the first separator, and forming a groove by bending both of the horizontal ends in one direction;

a third step of shaping the second separator into a concave by setting its central part to be NW while setting its horizontal end to be longer than NT, the central part including a center of the width of the second separator while the horizontal end placing at one end of the width of the second separator, and forming a groove by bending both of the horizontal ends in one direction;

a fourth step of inserting the positive electrode plate into the groove of the first separator;

a fifth step of inserting the negative electrode plate into the groove of the second separator; and a sixth step of putting the first separator and the second separator together, the first separator into which the positive electrode plate is inserted and the second separator into which the negative electrode plate is inserted, and spirally winding the first separator and the second separator together in the longitudinal direction of the positive electrode plate and the negative electrode plate.

18. The method of claim 17, wherein the width PW of the positive electrode plate and the width NW of the negative electrode plate prepared at the first step are identical to each other.

19. The method of claim 18, wherein a width PSW of the first separator prepared at the first step satisfies an inequality 1: $PW+2PT<PSW \leq PW+2PT+2NST+2NT$, in which NST represents a thickness of the second separator; and a width NSW of the second separator prepared at the first step satisfies an inequality 2: $NW+2NT<NSW \leq NW+2NT+2PST+2PT$, in which PST represents a thickness of the first separator.

20. The method of claim 19, wherein at the fourth step the main surface of each electrode plate which is set with the separator faces toward a back surface of an oppositely polarized separator, and the separators are wound together by making a main surface of the oppositely polarized separator inside.

21. The method of claim 19, wherein the horizontal ends of the first separator which are bent in the same direction are each the same length.

22. The method of claim 19, wherein the horizontal ends of the second separator which are bent in the same direction are each the same length.

23. The method of claim 21, wherein at the second step the first separator is shaped into the concave by preparing a first concave frame with a groove whose width is closely conforming with, but greater than PW, the width being perpendicular to a longitudinal direction of the groove, and a first plate whose width conforms substantially with PW, the width being perpendicular to a longitudinal direction of the first plate; overlapping the central part of the first separator with a central part of the groove, the central part of the groove including center of the width of the groove; and pushing the first separator with the first plate so that first separator is inserted into the groove of the first concave frame.

24. The method of claim 22, wherein at the second step the second separator is shaped into the concave by preparing a second concave frame with a groove whose width is closely conforming with, but greater than NW, the width being perpendicular to a longitudinal direction of the groove, and a second plate whose width conforms substantially with NW, the width being perpendicular to a longitudinal direction of the second plate; overlapping the central part of the second separator with a central part of the groove, the central part of the groove including a center of the width of the groove; and pushing the second separator with the second plate so that the second separator is inserted into the groove of the second concave frame.

25. A method for producing a spiral electrode group from beltlike electrode plates having opposed parallel maid surfaces and substantially rectangularly arranged side surfaces extending therebetween, the method comprising:

a first step of preparing a beltlike positive electrode plate whose thickness and width are PT and PW respectively, the width being perpendicular to a longitudinal direction of the positive electrode plate, a beltlike negative electrode plate whose thickness and width are NT and NW respectively, the width being perpendicular to a longitudinal direction of the negative electrode plate, a beltlike first separator whose width is longer than PW+2PT, the width being perpendicular to a longitudinal direction of the first separator, and a beltlike second separator whose width is longer than NW+2NT, the width being perpendicular to a longitudinal direction of the second separator;

a second step of setting a horizontal end of the first separator to be longer than PT, the horizontal end placing at an ed of the width of the first separator, placing a main surface of the positive electrode plate on a parallel surface of the first separator, and bending the horizontal end of the first separator along with a side surface of the positive electrode plate, the side surface being disposed at an end of the width of the positive electrode plate;

a third step of setting a horizontal end of the second separator to be longer than NT, the horizontal end being disposed at an end of the width of the second separator, placing a main surface of the negative electrode plate on a parallel surface of the second separator, and being the horizontal end of the second separator along with a side surface of the negative electrode plate, the side surface being disposed at an end of the width of the negative electrode plate; and a four step of spirally winding the positive electrode plate which is being with the first separator and the negative electrode plate which is being with the second separator together in the longitudinal direction of the positive electrode plate and the negative electrode plate.

26. The method of claim 25, wherein the width PW of the positive electrode plate and the width NW of the negative electrode plate prepared at the first step are identical to each other.

27. The method of claim 26, wherein a width PSW of the first separator prepared at the first step satisfies an inequality 1: $PW+2PT<PSW \leq PW+2PT+2NST+2NT$, in which NST represents a thickness of the second separator; and a width NSW of the second separator prepared at the first step satisfies an inequality 2: $NW+2NT<NSW \leq NW+2NT+2PST+2PT$, in which PST represents a thickness of the first separator.

28. The method of claim 27, wherein at the fourth step the main surface of each electrode plate which is set with the separator faces toward a back surface of an oppositely polarized separator, and the separators are wound together by making amain surface of the oppositely polarized separator inside.

29. The method of claim 27, wherein the horizontal ends of the first separator which are bent in the same direction are each the same length.

30. The method of claim 27, wherein the horizontal ends of the second separator which are bent in the same direction are each the same length.

31. The method of claim 29, wherein at the second step the set of the first separator and the positive electrode plate is generated by preparing a first concave frame with a groove whose width is closely conforming with, but greater than PW, the width being perpendicular to a longitudinal direction of the groove, and a first plate whose width conforms substantially with PW, the width being perpendicular to a longitudinal direction of the first plate; overlapping the central part of the first separator and a central part of the positive electrode plate with a central part of the groove, the central part of the positive electrode plate including a center of the width thereof while the central part of the groove including a center of the width thereof; and pushing the first separator with the first plate so that the first separator is inserted into the groove of the first concave frame.

32. The method of claim 30, wherein at the second step the set of the second separator and the negative electrode plate is generated by preparing a second concave frame with a groove whose width is closely conforming with, but greater than NW, the width being perpendicular to a longitudinal direction of the groove, and a second plate whose width conforms substantially with NW, the width being perpendicular to a longitudinal direction of the second plate; overlapping the central part of the second separator and a central part of the negative electrode plate with a central part of the groove, the central part of the negative electrode plate including a center of the width thereof while the central part of the groove including a center of the width thereof; and pushing the second separator with the second plate so that the second separator is inserted into the groove of the second concave frame.

* * * * *